United States Patent
DiGiovanni et al.

(10) Patent No.: US 7,627,219 B2
(45) Date of Patent: Dec. 1, 2009

(54) LARGE MODE AREA FIBER AMPLIFIERS WITH REDUCED STIMULATED BRILLOUIN SCATTERING

(75) Inventors: David J. DiGiovanni, Mountain Lakes, NJ (US); Marc D. Mermelstein, Highland Park, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 11/982,694

(22) Filed: Nov. 1, 2007

(65) Prior Publication Data

US 2009/0116800 A1    May 7, 2009

(51) Int. Cl.
G02B 6/02 (2006.01)
G02B 6/028 (2006.01)
G02B 6/00 (2006.01)

(52) U.S. Cl. .................. 385/124; 385/123; 385/142; 359/341.5

(58) Field of Classification Search ......... 358/123–128, 358/141–143; 359/334, 341.1, 341.5
See application file for complete search history.

(56) References Cited

U.S. PATENT DOCUMENTS

| | | | |
|---|---|---|---|
| 6,307,996 B1 * | 10/2001 | Nashimoto et al. .......... 385/130 |
| 6,542,683 B1 | 4/2003 | Evans et al. |
| 6,687,440 B2 * | 2/2004 | Balestra et al. ............. 385/123 |
| 6,898,351 B2 | 5/2005 | Yeniay et al. |
| 6,952,519 B2 | 10/2005 | Bickham et al. |
| 6,959,135 B1 | 10/2005 | Bickham et al. |
| 6,965,469 B2 | 11/2005 | Avizonis et al. |
| 7,082,243 B2 | 7/2006 | Bickham et al. |
| 7,099,544 B2 | 8/2006 | Bickham |
| 7,130,514 B1 | 10/2006 | Chen et al. |
| 7,228,039 B2 | 6/2007 | Bickham et al. |
| 2006/0013545 A1 | 1/2006 | Varnham et al. |
| 2006/0103919 A1 | 5/2006 | DiGiovanni et al. |
| 2007/0019283 A1 | 1/2007 | Mermelstein et al. |
| 2007/0081779 A1 * | 4/2007 | Flammer ..................... 385/123 |
| 2007/0116416 A1 | 5/2007 | Chen et al. |
| 2008/0008432 A1 * | 1/2008 | Dragic ....................... 385/127 |

(Continued)

FOREIGN PATENT DOCUMENTS

WO    WO 2007114105 A1 * 10/2007

OTHER PUBLICATIONS

Li et al., "Al/FE co-doped large mode area fiber with high SBS Threshold", Jun. 25, 2007/ vol. 15, No. 13/ Optics Express, pp. 8290-8299.

(Continued)

*Primary Examiner*—Daniel Petkovsek (57) ABSTRACT

A large mode area fiber amplifier suitable for high power applications includes a core region specifically configured to allow for high power operation while also limiting the amount of SBS that is generated. The composition of the core region is selected to include a dopant (such as aluminum) in selected areas to reduce the acoustic refractive index of the core and limit the spatial overlap between the acoustic and optical fields. The acoustic refractive index is also structured so that the acoustic field is refracted away from the central core area. In one embodiment, the core may comprise a depressed index center portion and surrounding ring core area, with the center portion including the aluminum doping and the ring formed to have a diameter less that the phonon decay length for the operating wavelength(s).

14 Claims, 8 Drawing Sheets

U.S. PATENT DOCUMENTS

2008/0013906 A1* 1/2008 Matsuo et al. .............. 385/127

OTHER PUBLICATIONS

Dragle et al., "Optical Fiber with an Acoustic Guiding Layer for Stimulated Brillouin Scattering Suppression", 2005 Optical Society of America.

Gray et al., "High Power, Narrow Linewidth Fiber Amplifiers", Science and Technolgy Division, Corning Incorporated.

Walton et al., "Kilowatt-level, narrow-linewidth capable fiber and lasers", Proc. of SPIE, vol. 6453, pp. 645312-1 to 645314-10.

Trinh et al., "Integrated Optical Directional Couplers in Silicon-On-Insulator", Electronics Letters, Nov. 23, 1995, vol. 31, No. 24, pp. 2097-2098.

Machewirth et al., "Large Mode Area Double Clad Fibers for Pulsed and CW Lasers and Amplifiers".

Kobyakov et al., "Design Concept for Optical Fibers with Enhanced SBS Threshold", Jul. 11, 2005, vol. 13, No. 14/ Optics Express, pp. 5338-5346.

Walton, et al., "High Power, narrow linewidth fiber lasers", Science and Technology Division, Corning Incorporated.

Vonsovici et al., "Numerical Simulation of a Silicon-On-Insulator Waveguide Fabry- Perot Interferometer for Intensity Light Modulators at 1.3 μm", Journal of Lightwave Technology, vol. 15, No. 11, Nov. 1997, pp. 2124-2129.

Mermelstein, et al., "All-fiber 194 W Single-Frequency Single-Mode Yb-doped Master-Oscillator Power Amplifier", LEOS 2007, Oct. 1, 2007, pp. 382-383.

* cited by examiner

5.6 dB Suppression
(8.1 dB after Aeff equalization)

FIG. 13 (b)

LARGE MODE AREA FIBER AMPLIFIERS WITH REDUCED STIMULATED BRILLOUIN SCATTERING

TECHNICAL FIELD

The present invention relates to large mode area (LMA) optical fibers utilized in fiber amplifiers and, more particularly, to LMA optical fibers including selected regions with a structured acoustic refractive index profile within the optical core section that is designed to exclude/refract acoustic energy away from regions occupied by the optical mode, thereby reducing stimulated Brillouin scattering (SBS).

BACKGROUND OF THE INVENTION

Laser systems including fiber amplifiers are commonly used in many applications, including telecommunications applications and high-power military and industrial fiber optic applications. In operation, the propagating optical signal from a laser source is introduced in the core region of a section of optical fiber and is amplified through the use of an optical "pump" signal. The pump is of a predetermined wavelength that will interact with particular dopants included in the core region of the fiber amplifier (typically rare earth materials, such as erbium, ytterbium, or the like) to amplify the propagating optical signal.

High power fiber amplifiers are often limited in power, however, as a result of the unwanted creation of stimulated Brillouin scattering (SBS). That is, the strong optical signal is scattered in the backward direction by thermally-generated acoustic waves (i.e., thermal Brillouin scattering) in the core of the optical fiber. This backscattered light is down-shifted in optical frequency (Stokes scattering) from the incident light by the Brillouin shift frequency $\Omega_B$ (rad/sec) which is determined by the optical wavelength, the core refractive index and the sound speed in the core. The Stokes-shifted, backward-propagating light combines with the original forward-propagating signal light to create a traveling periodic intensity pattern in the fiber core. This intensity pattern causes a traveling periodic modulation of the fiber density due to the electrostrictive effect, which is the tendency of a material to compress in the presence of strong optical intensity and, therefore, generates a forward-propagating, electrostrictively-generated sound wave similar to (and with the same sound speed as) the acoustic wave that caused the original light scattering event. This modulation reinforces the scattering process seeded by the original thermal Brillouin scattering event, thereby generating "stimulated Brillouin scattering", or SBS, in optical fibers. The reinforcement occurs via two different mechanisms: (1) the electrostrictively-generated sound wave creates additional scattering at the same wavevector and frequency, and (2) the electrostrictively-generated pressure will mechanically drive the acoustic phonon that generated the original thermal Brillouin scattering. The SBS energy travels in a backward direction and is shifted in frequency proportional to both the acoustic velocity and refractive index of the fiber. In one typical arrangement, the signal light is downshifted in frequency by about 15 GHz at an optical wavelength of 1083 nm.

The threshold condition for SBS can be written as:

$$P_{th} = \frac{21 A_{eff}}{g_B L}\left(1 + \frac{BW}{BW_{SiO_2}}\right), \qquad (1)$$

where $A_{eff}$ is the effective mode area of the fiber, $g_B$ is the Brillouin gain coefficient, L is the length of the fiber, BW is the bandwidth of the signal and $BW_{SiO_2}$ is the Brillouin bandwidth of a silica fiber.

In extreme cases, the back-reflected SBS energy robs power from the signal and clamps the output power. For high power rare earth fiber amplifiers, the back-reflected light is then further amplified by the rare earth material in the core region and can result in very high intensity backward propagating pulses that destroy the fiber or other upstream optical components. Increasing the performance of fiber amplifiers thus requires the reduction of SBS.

One technique for reducing the onset of SBS is to increase the area of the optical mode. As shown above, the SBS power threshold $P_{th}$ scales with effective mode area $A_{eff}$, since the optical intensity is reduced as the area increases. As a result, many manufacturers of specialty fiber for high power amplifiers produce fibers with large core diameters (on the order of, for example, 15-30 μm). However, increasing the core diameter beyond about 25 μm will increase bend loss and mode coupling, degrading the quality of the propagating optical signal.

Another approach to increasing the SBS threshold is to alter the acoustic field distribution in the fiber core. In a typical small mode area (SMA) fiber, the acoustic velocity of the core material is less than that of the surrounding cladding layer and therefore the acoustic refractive index is higher in the core region, causing the acoustic mode to be guided by the core, just as the optical field is guided. The resulting high spatial overlap between the optical and acoustical fields enhances the unwanted interaction and results in strong seeding of the SBS process via thermal Brillouin scattering. Moreover, the electrostrictively-driven acoustic field generated in the central core region occupied by the optical mode is guided by the acoustic waveguide thereby further enhancing SBS generation.

Figure 1:
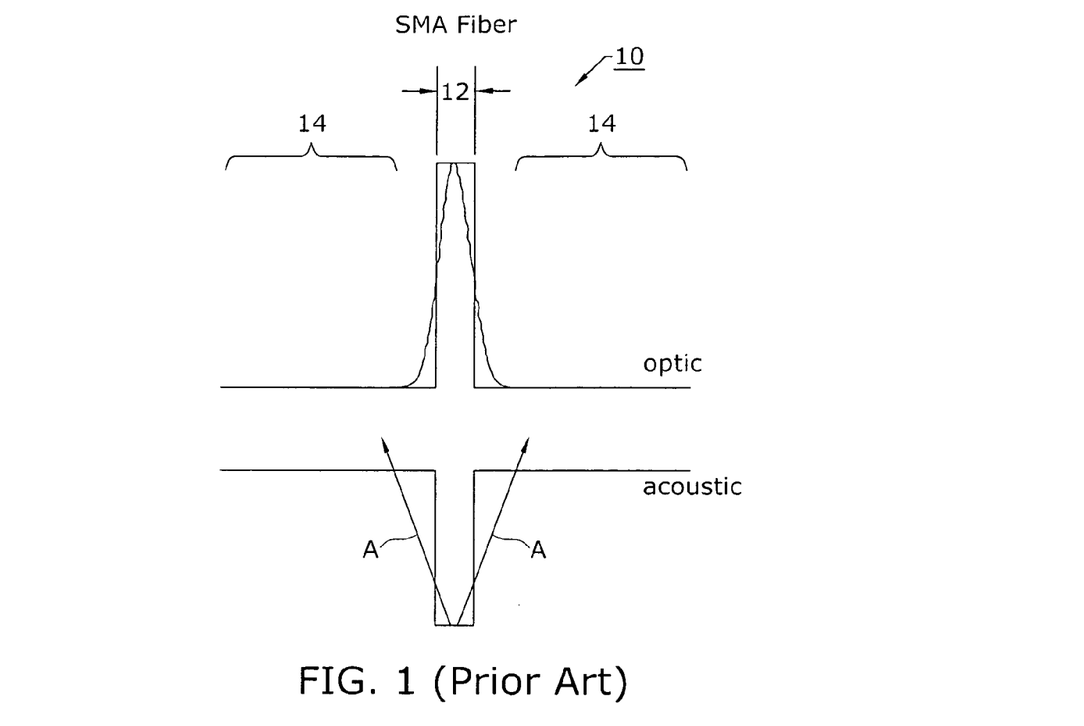
FIG. 1 is a refractive index profile for a prior art small mode area (SMA), showing both the optical and acoustical profiles.

It has been found that by altering the composition of the core and cladding so that the acoustic velocity of the core is greater than that of the cladding, the acoustic mode may be excluded from the central core region occupied by the optical mode. This exclusion of the acoustic mode will thereby reduce the thermal Brillouin scattering that seeds the SBS process. In addition, any generated acoustic field in the central core region will sample the core-cladding interface and refract out of the anti-guiding structure. FIG. 1 is a prior art illustration of this particular arrangement for a conventional small mode area (SMA) fiber, which shows the refractive index profile of such a fiber 10 with a composition selected so that the acoustic velocity of the core 12 is greater than that of the cladding 14. Both the optical and acoustical refractive index profiles are shown in FIG. 1. The acoustic index profile excludes thermal phonons from the optical core region and the anti-guiding structure causes acoustic energy to radiate out of the core region, as shown by arrows "A" in FIG. 1. As a result, the SBS threshold will be improved by more than a factor of two.

Figure 2:
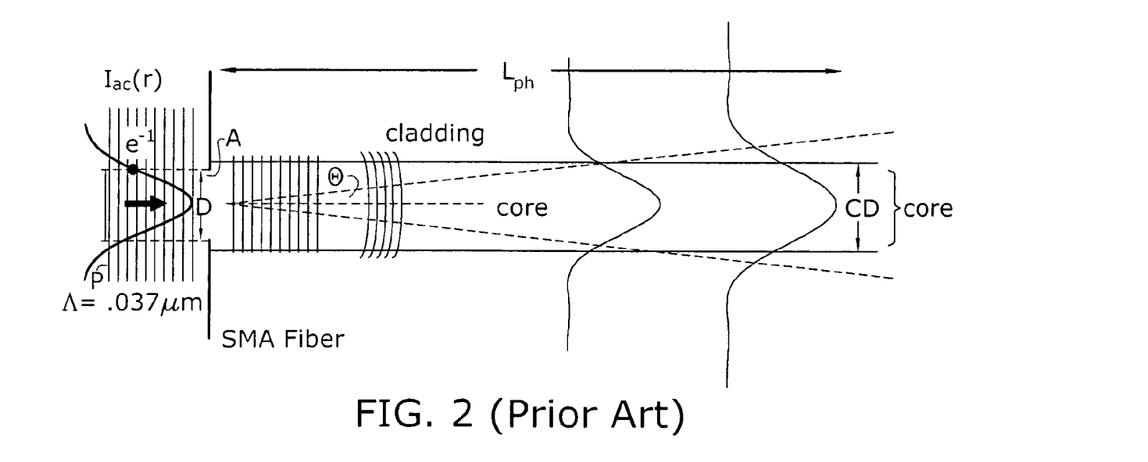
FIG. 2 illustrates the diffraction of an SBS-generated acoustic wave along the SMA fiber of FIG. 1.

FIG. 2 illustrates in particular the diffraction of an SBS-generated acoustic wave in the SMA fiber of FIG. 1. As mentioned above, the optically-induced acoustic wave is generated by the electrostrictive effect and is represented by a plane wave P and an aperture A. The presence of the circular aperture whose diameter D is chosen to be approximately equal to the 1/e points of the acoustic intensity distribution (for a Gaussian optical mode) causes the acoustic wave to diffract as it propagates beyond the aperture. The nature of the diffraction at a distance L from the aperture is governed by the Fresnel number, and the acoustic sound wave will exhibit a finite lifetime due to the conversion of the acoustic energy into heat within the fiber's glass material. The Fresnel number evaluated at the known phonon decay length $L_{ph}$ (38 μm) will have a value of 0.32 (thus, is less than one). Having a value of less than one, the acoustic wave undergoes far-field (Fraunhofer) diffraction in the manner shown in FIG. 2. As shown, the acoustic intensity distribution begins near the aperture to cover a region essentially the same as the core diameter. As the acoustic wave propagates during its lifetime, it spreads out (diffracts) and samples the core-cladding interface, as well as regions of the inner cladding beyond the core-cladding interface. Therefore, an acoustic index structure designed to suppress the onset of SBS in SMA fibers must be located in the region of the fiber sampled by the acoustic wave, in this case indicated by the shaded box in FIG. 2.

Figure 3:
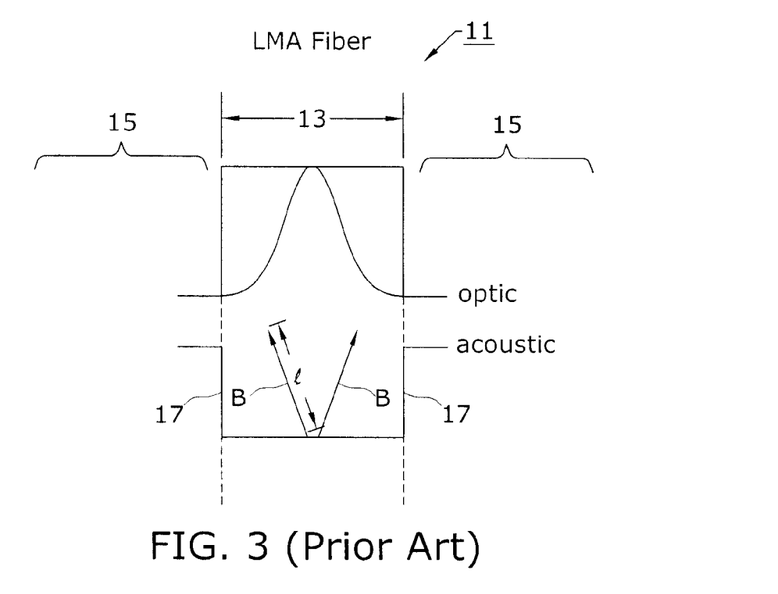
FIG. 3 is a refractive index profile for a prior art large mode area (LMA) fiber, again showing both the optical and acoustical profiles.

However, in large mode area (LMA) fibers, the optical field lies well within the core region, as shown in FIG. 3. An LMA fiber 11 is shown as comprising a relatively large diameter core region 13 and surrounding depressed cladding area 15. As shown, a diffracting acoustic ray (indicated by arrows "B") will remain within core area 13 and be unable to sample the core-cladding interface 17 of LMA fiber 11 since the distance to the interface exceeds the decay length $L_{ph}$ of the phonon.

Figure 4:
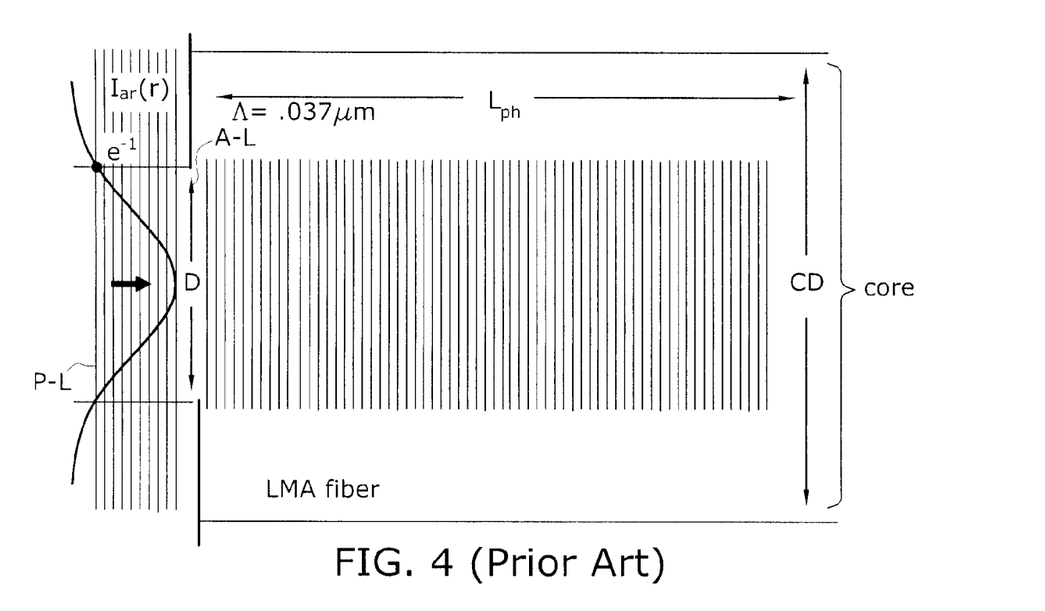
FIG. 4 illustrates the diffraction of an SBS-generated acoustic wave along the LMA fiber of FIG. 3.

FIG. 4 shows the acoustic diffraction of an SBS-generated sound wave within the LMA fiber 11 of FIG. 3. In general, an LMA fiber will have a core diameter (CD) greater than its mode field diameter (MFD), where it is presumed that CD=1.4*MFD. As with the illustration of FIG. 2, the SBS acoustic wave in the LMA fiber of FIG. 4 is represented by a plane wave P-L and an aperture A-L with an aperture diameter of D. For this arrangement, the calculated Fresnel number is 3.6— greater than one—and in that case corresponds to near-field (Fresnel) diffraction. Therefore, the acoustic energy lies within a radius defined by the aperture radius for the lifetime of the sound wave. Referring to FIG. 4, it is shown that the sound wave continues to propagate within the core without any appreciable spreading into the core-cladding interface— in contrast to the spreading associated with the SMA fiber shown in FIG. 2.

In summary, therefore, the various arrangements of the prior art cannot be configured to simultaneously provide large optical mode field and an effective anti-guiding acoustic structure. A need thus remains in the art for an arrangement that provides the reduction of the presence of SBS in LMA fibers, without compromising the high power performance of the LMA fiber itself.

SUMMARY OF THE INVENTION

The need remaining in the prior art is addressed by the present invention, which relates to fiber amplifiers and, more particularly, to large mode area (LMA) fiber amplifiers including particularly structured regions of the acoustic refractive index within the core area to reduce stimulated Brillouin scattering (SBS).

In accordance with the present invention, the desired large mode area characteristic and the provision of a structured acoustic refractive index are considered independently, allowing for the large mode size to be maintained while also assuring that the majority of thermally-generated acoustic fields, or phonons, reside outside of the region of the core occupied by the optical mode. More particularly, the structure of the acoustic refractive index is configured to: (1) exclude the thermal phonons from the region of the fiber occupied by the optical mode to reduce the overlap integral and the thermal Brillouin scattering cross-section; and (2) refract the electrostrictively-generated strain away from the core area where the optical intensity is the greatest, thus reducing the phonon-photon interaction time or interaction length. More particularly, the strain will be refracted away from the optical mode by having the acoustic index profile exhibit a "negative lens"—like characteristic. The lens characteristic may be further configured to divert the phonons through a sufficiently large angle so that the photon scattering angle exceeds the numerical aperture (NA) of the fiber. In this manner, the scattered light will propagate in a direction whose angle exceeds the fiber NA and will not be captured by the waveguide.

In one embodiment of the present invention, a graded, gradual change (e.g., ramp-like, generally monotonically decreasing) in the acoustic refractive index within the core area is used that will localize the acoustic mode in regions of the optical fiber core that are not occupied by the optical mode so as to raise the SBS threshold. Furthermore, the ramp-like acoustic profile is used and configured to exhibit a slope sufficient to allow the structure to function as a negative lens, as discussed above. In this case, the electrostrictively-generated acoustic strain waves are refracted away from the region occupied by the optical mode as governed by the acoustic index profile. Refraction of the acoustic field away from the portions of the fiber core region occupied by the optical mode reduces the interaction time (length) between the sound wave (phonon) and the light wave (photon)—i.e., the phonon-photon interaction time/length is decreased—thereby increasing the SBS threshold. If the acoustic refraction is sufficiently strong so that the acoustic wave propagates at a large angle with respect to the optical axis, then light scattered by the acoustic wave will be scattered at an 'escape angle' exceeding the numerical aperture (NA) of the fiber. Hence, this light is lost from the waveguide and cannot contribute to the onset of SBS; the SBS threshold is increased further as a result. Again, this particular configuration may be realized with a large mode area fiber, suitable for high power amplification applications.

In another embodiment of the present invention, the optical refractive index has a large depression in the central region of the core, thereby producing a ring-like core structure. The resultant optical mode is primarily localized in the ring region of the core (i.e., the "edges" of the core) and will therefore exhibit the desired large mode area. The acoustic index is designed to have a low value where the optical index is high (i.e., in the ring region), and a high value where the optical index is low. This acoustic index structure localizes the thermal phonon away from the optical mode and facilitates the refraction of the acoustic energy away from the ring region and into regions where there is little optical energy. As long as the width of the ring remains less than the phonon decay length, the acoustic energy will refract out of the optical field and minimize the generation of SBS.

In yet another embodiment of the present invention, the higher order modes (HOM) in a suitably-designed optical fiber exhibit very large effective areas and may also be considered LMA fibers suitable for use as fiber amplifiers with reduced SBS. A HOM fiber exhibits a highly-structured optical intensity profile that extends over a large core size (e.g., radii greater than approximately 40 μm have been demonstrated). An acoustic index profile for an inventive HOM fiber thus excludes the thermal acoustic modes from the regions of the core occupied by the optical mode and refracts the acoustic energy away from regions occupied by the optical mode, thereby reducing the acousto-optic interaction and increasing the SBS threshold in HOM fibers.

Other and further embodiments and aspects of the present invention will become apparent during the course of the following discussion and by reference to the accompanying drawings.

BRIEF DESCRIPTION OF THE DRAWINGS

Referring now to the drawings,

FIG. 9 illustrates an exemplary HOM fiber including, in FIG. 9(a) a structured acoustic refractive index including a plurality of depressed regions; FIG. 9(b) shows a particular embodiment of dopant profiles designed to achieve the desired optical and acoustic index profiles; and FIG. 9(c) includes a table listing the effects of various dopants upon the optical and acoustical indices relative to those in silica.

DETAILED DESCRIPTION

As will be discussed in detail below, the ability to reduce stimulated Brillouin scattering (SBS) in large mode area (LMA) fibers in accordance with the present invention involves the study and understanding of two separate design considerations. Firstly, it is required that the central core region of the LMA be configured to exhibit a structured acoustic index that will exclude the thermally-generated acoustic fields (phonons) from the central portion of the core (where the majority of the optical mode resides), reducing the overlap integral between the optic and acoustic components as well as the thermal Brillouin light scattering cross-section. It is this thermal Brillouin light scattering that seeds the SBS process in a manner similar to that already described for SMA fibers (thus increasing the threshold at which SBS is initiated). Inasmuch as desired acoustic index structure is accomplished by a relatively minor contrast in acoustic index between regions, it is unnecessary to chose dopant concentrations that create large contrasts. This is attractive since it reduces the difficulty of manufacturing these complex structures. However, this acoustic index structure does not meet the needs of the second consideration, in which the acoustic refractive index is controlled to refract the electrostrictively-generated strain away from the core where the optical intensity is greatest, thus reducing the phonon-photon interaction time or length.

Both of these design considerations are addressed in accordance with the present invention by designing a "negative acoustic lens" within the interior of the optical core to refract the acoustic energy away from the central core region occupied by the optical mode. A geometric "acoustic" description of the sound wave propagation in the optical fiber is appropriate, since the wavelength of the acoustic wave is approximately equal to 0.4 µm and is much smaller than the core diameter (shown as being approximately 45 µm) or the mode field diameter (shown as being approximately 25 µm).

Figure 5:
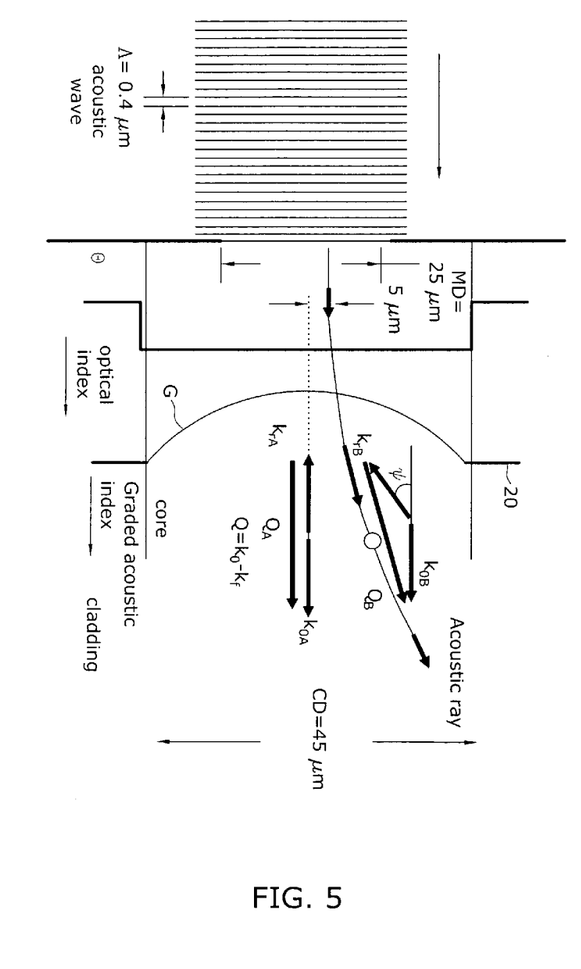
FIG. 5 is a ray diagram illustrating the application of a negative acoustic refractive profile ("lens") to diffract acoustic rays away from the optical axis of an LMA fiber in accordance with the present invention.

The use of a "negative acoustic lens" has been found to suppress the generation of SBS in two ways. First, the lens will minimize the interaction time or length of the electrostrictive acoustic fields with the optical mode. Further, and as described in detail below, the presence of the lens will bend the acoustic rays sufficiently such that the scattering angle for the Stokes light generated from scattering by the electrostrictively-driven acoustic fields will exceed the fiber numerical aperture and escape the optical waveguide. Such an acoustic lens 20 is illustrated in FIG. 5. The bending of the acoustic rays by the structured acoustic index is described in the following paragraphs.

In a conventional, prior art optical fiber with an acoustically uniform core, an incident optical wave with a wave vector $k_{0A}$ and radian frequency $\omega_{0A}$ is scattered by a retreating acoustic wave of wave vector $Q_A$ and radian frequency $\Omega$ equal to the Brillouin shift frequency $\Omega_B$, as shown in FIG. 5. The backscattered Stokes light will have a wave vector $k_{fA}$ and radian frequency $\Omega_{fA} = \Omega_{0A} - Q_B$. The wave vectors of the optical and acoustic waves are all collinear with the fiber optic axis and satisfy the conservation of momentum requirement: $k_{0A} = k_{fA} + Q_A$.

In accordance with the present invention, the presence of the negative acoustic index gradient associated with lens 20 (shown as profile "G" in FIG. 5) will cause the retreating acoustic wave to bend, as represented in FIG. 5 by acoustic ray $Q_B$. This will aid SBS suppression in two ways: (1) reducing the phonon-photon interaction time (length) and peak Brillouin gain, and (2) increasing the light scattering angle to exceed the escape angle or fiber numerical aperture.

Acoustic phonons, whether thermally generated or generated by the electrostrictive effect, will contribute to the SBS as long as they persist in the presence of the optical mode. For a thermally generated phonon, the time constant for this interaction is given by the phonon lifetime associated with the conversion of acoustic energy to heat. The phonon lifetime τ and the gain bandwidth $\Delta v_B$ are related by: $\Delta v_B = 1/\pi\tau$. The peak Brillouin gain $g_B$ is given by: $g_B = 2\pi^2 \cdot n^7 \cdot p^2 \cdot \tau/c \cdot \lambda^2 \cdot \rho \cdot V$ where n is the refractive index, p is the photoelastic constant, c is the speed of light, ρ is the core density and V is the core sound speed. Thus, the peak Brillouin gain is found to be proportional to the phonon lifetime τ.

The presence of a gradient in the acoustic index profile in accordance with the present invention results in the acoustic energy being refracted away from the regions of low acoustic index. Therefore, the phonon will spend less time in the presence of the optical mode. It will thereby have a reduced effective lifetime τ and reduced Brillouin gain. This will contribute to the SBS suppression.

With respect to the subject of escape angle control, after refraction by negative acoustic lens 20, the scattered wavevector: $k_{fB} = k_{0B} - Q_B$ appears at an angle ψ with respect to the optic axis, as shown in FIG. 5. This angle ψ will be determined by the structure of the acoustic negative index profile as configured in accordance with the present invention. In particular, it is desirable to use acoustic indices with a sufficiently large gradient (dN/dr) and index contrast ($N_{clad}-N_{core}$) such that the scattering angle ψ is greater than the fiber numerical aperture. The scattered light will escape the waveguide and be unable to participate in the SBS process, leading to further SBS suppression.

Figure 6:
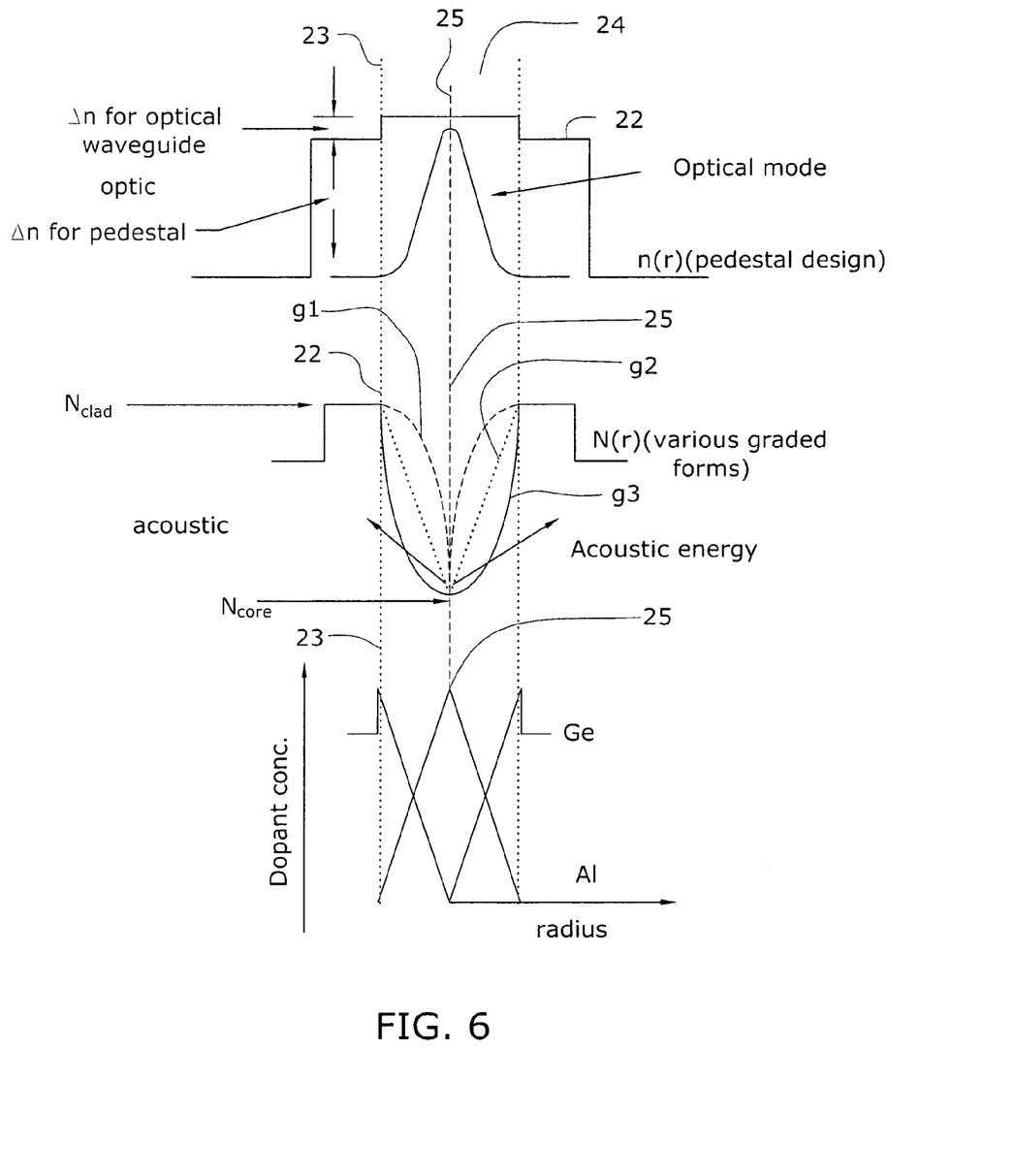
FIG. 6 is a refractive index profile of an exemplary "pedestal" index LMA fiber of the present invention.

It is desirable to create a large acoustic index gradient and a large acoustic index contrast without also creating a large optical index contrast which would alter the optical mode. This is achieved in a fiber core with a pedestal design for the optical index, as shown in FIG. 6. The pedestal design allows for the use of high dopant concentration (Ge and Al) in the core and surrounding pedestal, thereby significantly modifying the acoustic velocity of the glass. This extends the available range for acoustic properties useful in creating the desired acoustic index contrast. The optical field responds to the contrast in optical index, which can be made small by adjusting the contrast between the pedestal and the core, despite the high dopant concentration. Referring to FIG. 6, a pedestal 22 with a high germanium concentration surrounds a core 24 composed of a radially-tailored mix of germanium and aluminum. The germanium concentration ranges from a high value at the edge 23 of the core, to a low value at the center 25 of the core 24. The aluminum concentration follows the opposite profile. The relative concentrations of germanium and aluminum are balanced to create a uniform optical index, while the acoustic index varies across the wide range afforded by the variation from high Ge-only doping at the outside of the core to high Al-only doping at the center of the core.

The graded acoustic index may be configured to exhibit various geometries, where three different potential grading geometries g1, g2 and g3 are shown in the acoustic profile of FIG. 6. These geometries may be achieved, for example, by varying the ratio of Al to Ge dopant in the fiber core, with a maximum amount of Al and no Ge on the optic axis (center of core 25), and the maximum amount of Ge and no Al at the inner core (~10 um radius) where Al depresses the acoustic index and Ge increases the acoustic index relative to that in silica. In any event, the slope of the acoustic profile needs to be sufficient to induce the creation of a negative lens structure. In particular, a slope on the order of 0.01/μm has been used successfully to create the negative lens. More generally, a value greater than 0.005 μm will provide a sufficient slope to induce the negative lens effect.

It is to be noted that the pedestal structure of the optical index allows for the small index difference between the core and surrounding region (pedestal region) required for a large mode area (optical) design, while simultaneously allowing for the use of high dopant concentrations of Al and Ge, thereby providing a large acoustic index contrast (difference) between the central and outer core regions. Contrast values greater than approximately 0.05 are considered to be sufficient for the purposes of the present invention.

Turning now to the study of SBS suppression in LMA fibers using acoustic modal analysis, the analysis is based upon the fact that an exemplary optical fiber can be defined as a rod of glass with a transverse distribution of optical refractive index and acoustic refractive index that is determined by the dopants in the glass matrix. The optical refractive index is given by n(r)=c/v(r) where c is the speed of light in vacuum and v(r) is the phase velocity of light as a function of radius. Similarly, the acoustic refractive index is given by $N(r)=V_{SiO_2}/V(r)$ where V(r) is the speed of sound at a radius r and $V_{SiO_2}$ is the speed of sound in the silica cladding. The light is guided by the refractive index profile n(r). The acoustic index profile N(r) determines the normal modes of vibration of the glass cylinder or the thermal acoustic phonons. These may be calculated in terms of the density fluctuations ρ(r) given by the Helmholtz equation:

$$\nabla_\perp^2 \rho(r) + \left(\frac{2\pi}{\Lambda_0}\right)^2 \cdot N(r)^2 \cdot \rho(r) = \left(\frac{2\pi}{\Lambda_0}\right)^2 N_{eff}^2 \cdot \rho(r) \quad (2)$$

where $\nabla_\perp^2$ is the transverse Laplacian operator, f is the acoustic frequency in Hz, $\Lambda_0$ is the acoustic wavelength in silica, $f \cdot \Lambda_0 = V_{SiO_2}$, $v_{SiO_2}$ is the speed of sound in the silica inner cladding and $N_{eff}$ is the effective acoustic index. Brillouin scattering also requires that the Bragg condition be satisfied to ensure that the optical field resonantly excites the acoustic field, namely:

$$\frac{2\pi \cdot N_{eff}}{\Lambda_0} = \frac{4\pi \cdot n_{eff}}{\lambda}, \quad (3)$$

where λ is the optical wavelength and $n_{eff}$ is the effective optical index. These two conditions yield the normal modes of vibration of the fiber for a particular acoustic index profile in terms of the $m^{th}$ acoustic eigenfrequency $f_m$ and $m^{th}$ acoustic eigenfunctions $\rho_m(r)$ that can participate in the thermal Brillouin scattering event. The eigenfrequencies are expressed in terms of the acoustic effective index $N_{eff}^m$:

$$f_m = 2 \cdot n_{eff} \cdot V_{SiO_2}/N_{eff}^m \cdot \lambda. \quad (4)$$

The density variations $\rho_m(r)$ create fluctuations in the optical dielectric constant ∈ which gives rise to the scattered electric field:

$$E_{scat}(r) = K \cdot (\partial \in / \partial \rho) \cdot \rho_m(r) \cdot E(r) \quad (5),$$

where K is a constant of proportionality and E(r) is the modal electric field distribution. The field amplitude A of the scattered electric field $E_{scat}(r)$ that is captured by the same fiber mode is proportional to the overlap between the scattered field $E_{scat}(r)$ and the modal field E(r):

$$A = 2\pi \cdot K \cdot (\partial \in / \partial \rho) \cdot \int dr \cdot r \cdot \rho_m(r) \cdot E(r)^2 \quad (6).$$

This expression may be squared and renormalized to yield an optical power normalized overlap integral:

$$\Gamma_m = \frac{\langle \rho_m(r) \cdot E(r)^2 \rangle^2}{\langle \rho_m(r)^2 \rangle \cdot \langle E(r)^4 \rangle}, \quad (7)$$

where the angular brackets indicate an integral over the cross section of the fiber, and $\Gamma_m$ is a measure of the light intensity back-scattered from the forward propagating light in the optical mode by the density fluctuations $\rho_m(r)$ and captured by the same optical mode. Note that $\Gamma_m=1$ if there is perfect overlap between the acoustic and optical modes, and that $\Gamma_m=0$ if there is no overlap. Hence, the maximum optical power will be scattered into the optical mode E(r) by the acoustic phonon density fluctuation $\rho_m(r)$ that maximizes the overlap integral $\Gamma_m$. In contrast, suppression of thermal Brillouin scattering and SBS requires an acoustic design, in particular an acoustic index profile N(r), that minimizes $\Gamma_m$.

Although Γm may be minimized by the above-described pedestal acoustic index structure of FIG. 6, in general it will not be equal to zero and there will be some thermal Brillouin scattering that is captured by the optical mode. This will create an electrostrictive density fluctuations $\tilde{\rho}(r)$ with a transverse distribution proportional to the optical mode intensity $E(r)^2$. These density fluctuations will (by definition) have a unity overlap integral and scatter light at the same frequency and wavevector as that scattered by the thermal phonon and will contribute to the generation of SBS.

The electrostrictive pressure wave, given by $p(r)=\gamma \cdot E(r)^2/8\pi$, travels with a sound speed equal to that of the thermal phonon. The transverse distribution of the pressure wave is equal to the modal intensity distribution. Mechanical work is done on the acoustic mode by the electrostrictive pressure wave, thereby increasing its energy and the thermal Brillouin scattering that seeds the SBS process. The efficiency of the electrostrictive driving of the thermal phonon is proportional to the product of the pressure wave and the density fluctuations:

$$W_{mech} = 2\pi \cdot K' \cdot \int dr \cdot r \cdot p(r) \cdot \rho_m(r) \qquad (8)$$

$$= \frac{\gamma K'}{4} \cdot \int dr \cdot r \cdot E(r)^2 \cdot \rho_m(r)$$

where K' is a constant. Hence the efficiency of the electrostrictive driving of the thermal phonons may also be parameterized by the normalized overlap integral $\Gamma_m$. This mechanical driving of the thermal phonon will also contribute to the generation of SBS.

Figure 7:
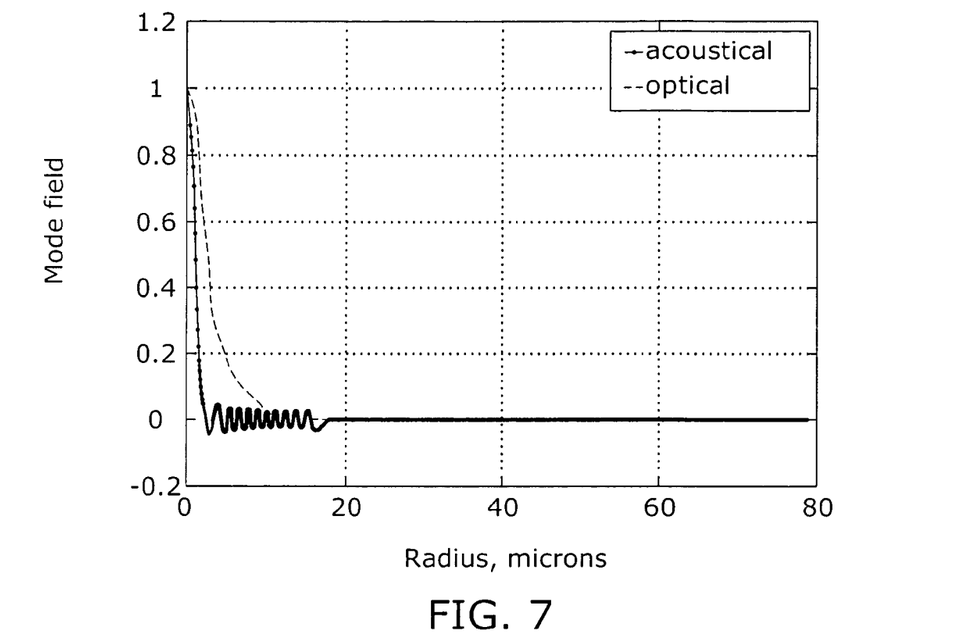
FIG. 7 contains a plot illustrating the optical mode intensity distribution of the inventive LMA fiber and the associated acoustic eigenfunction that exhibits the greatest overlap with the optical mode intensity distribution.

A basic intent of the present invention to design a fiber with an acoustic index profile N(r) that will yield acoustic eigenfunctions $\rho_m(r)$ which minimize the overlap $\Gamma_m$ with the optical field in the central core region and thereby reduce the thermal Brillouin scattering that seeds the SBS process. The acoustic eigenfunctions for a graded acoustic index designed to minimize the overlap between the strain and optical fields have been investigated by numerical simulation. As an example, the acoustic eigenfunctions for an acoustic index profile similar to that shown in FIG. 6 have been examined in detail. All of the acoustic eigenfunctions have been calculated and the overlap integrals $\Gamma_m$ have been calculated as well. The onset of SBS is expected to be initiated by the acoustic eigenfunctions having the largest value of the overlap integral $\Gamma_m$. This eigenfunction is shown in FIG. 7, where in this case the overlap integral $\Gamma_m$ is equal to 0.32. The optical mode intensity distribution of the fiber is shown in FIG. 7 as well.

Furthermore, the acoustic index profile N(r) should be such that it forms a negative acoustic lens-like structure to disperse the electrostrictively-generated sound waves and thereby reduce their interaction with the optical mode and scatter light at angles exceeding the fiber numerical aperture, as discussed above.

In addition to the consideration of acoustic excitation, designs may be developed based on attention to phonon lifetime. As mentioned above, since the lifetime and pathlength of the optically-induced phonons is short (for some ranges of acoustic index contrast), the physical size of the optical features cannot be large if one requirement is to maintain a relatively low level of SBS. This physical size restriction, however, is counter to the desire to have a large modefield for increased optical power in fiber amplifier applications.

Figure 8:
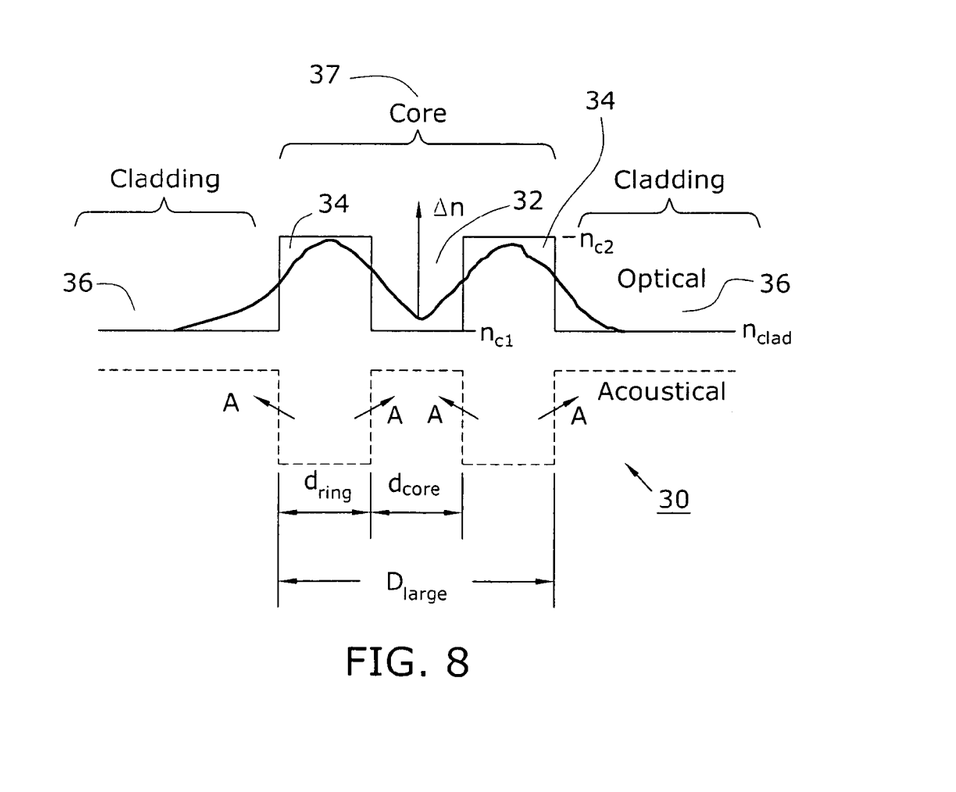
FIG. 8 is a refractive index profile of an exemplary LMA fiber including a ring-like core area for providing the desired depressed index and structured acoustic refractive index in accordance with the present invention.

In one embodiment of the disclosed invention, the large area optical mode is determined by an optical index exhibiting a ring-like structure with the acoustic index designed to exclude the acoustic wave from regions of the core occupied by the optical mode. Preferably, a "depressed cladding" central core portion and a "ring" core portion of a higher refractive index surrounding the depressed cladding central core portion are used to form this structure. FIG. 8 illustrates the optical and acoustical refractive index profiles for an exemplary optical fiber 30 formed in accordance with this embodiment of the present invention. As shown, fiber 30 includes a central core portion 32 with a refractive index value $n_{c1}$ that is surrounded by a ring core portion 34 with a refractive index value $n_{c2}$ such that $n_{c2}>n_{c1}$. A cladding layer 36 surrounds ring core portion 34 and has a refractive index value $n_{clad}$ less than $n_{c2}$ such that the propagating optical signal remains guided within core area 38 formed by central core portion 32 and ring core portion 34.

Referring to FIG. 8, the diameter of core area 38 is defined as $D_{large}$, measured as the full extent across both central core portion 32 and ring core portion 34. Since the optical power properties are defined, in part, by this diameter $D_{large}$, the desired large optical modefield is provided by the structure of core area 38 of fiber amplifier 30. However, it has been found that the acoustical properties of this configuration will be defined by the diameter of ring core portion 34, denoted as $d_{ring}$ in FIG. 8. Therefore, as long as ring diameter $d_{ring}$ remains less than the phonon decay length (about 20 µm), the acoustic energy will refract out of the optical field. This refraction is indicated by arrows "B" in FIG. 8. Radiating the acoustic energy away from the optical field has been found to be effective in reducing SBS, since it reduces the spatial overlap of the optical and acoustical fields.

The composition of fiber 30 of the present invention is selected to provide the desired optical refractive index profile as shown in FIG. 8, while also providing the desired degree of optical gain required for amplifying purposes. Dopants such as, for example, Al, P and Ge will increase the (optical) refractive index of pure silica fiber, while doping a silica fiber with F will reduce the (optical) refractive index. With respect to an understanding of the acoustic refractive index, all relevant dopants will increase the acoustic index except for Al, which has been found to reduce the acoustic refractive index. In light of these properties, several variations in fiber composition may be utilized to provide the desired refractive index profile of fiber 30 as shown in FIG. 8. For example, central core portion 32 and cladding layer 36 may comprise pure or lightly-doped silica, with ring core portion 34 doped with Yb (a rare-earth dopant for amplification purposes) and Al (to reduce the acoustic refractive index). Alternatively, other dopants such as F and P can be used to facilitate rapid dopant diffusion during splicing of fiber 30 to an adjoining section of communication fiber, so as to smooth out the index profile in the splice area and return the overall fiber profile to the more conventional Gaussian distribution.

Figure 9:
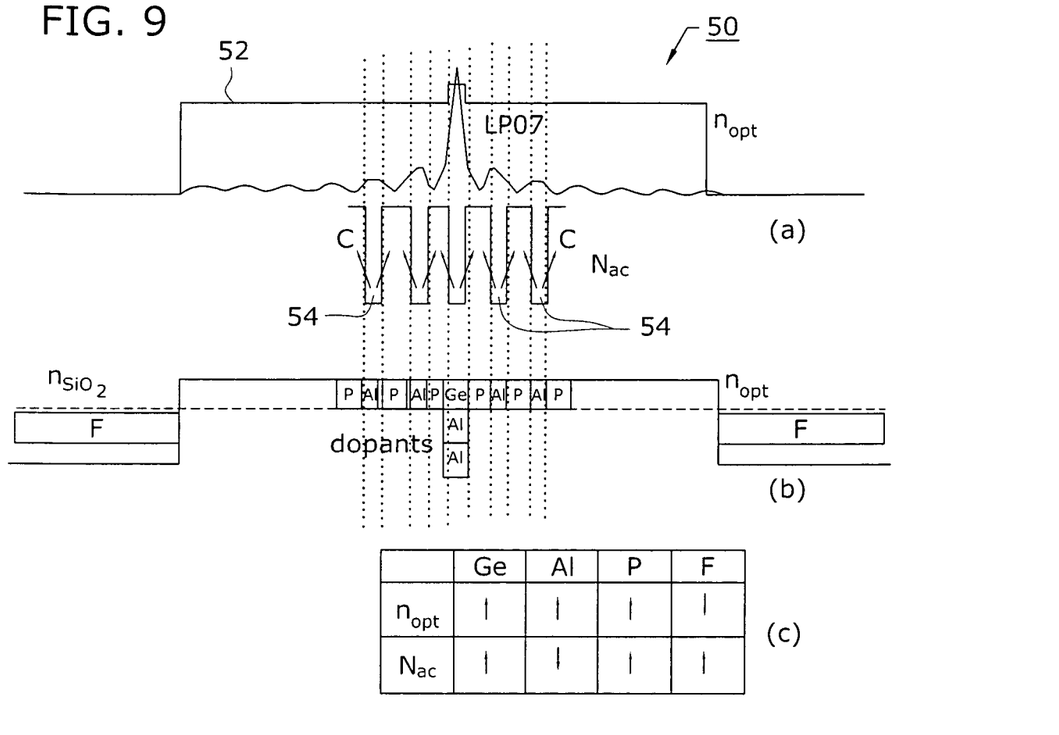

As mentioned above, the higher order modes (HOM) in a suitably-designed optical fiber exhibit very large effective areas and may therefore also be thought of as a "large mode area" fiber for the purposes of increasing the SBS threshold. FIG. 9(a) illustrates one exemplary HOM fiber 50 (with the LP07 mode), having an optical core 52 with a radius on the order of 40 µm. In this case, the acoustic profile is necessarily configured to exclude the thermal acoustic modes from the regions of the core occupied by the optical mode, thereby reducing the acousto-optic interaction and increasing the SBS threshold. As shown, the acoustic profile includes a plurality of depressed acoustic refractive index value regions 54, forming a plurality of rings within the core region, wherein the spacing of the regions is selected to provide for refraction of the acoustic rays away from the optical mode field, denoted by arrows "C" in FIG. 9.

In the exemplary embodiment of FIG. 9(b), alternating layers of P and Al allow the increase and decrease, respectively, of the acoustic index profile to achieve refraction of the acoustic energy away from regions of the core occupied by the optical energy while maintaining the constant optical index required for the higher order optical mode. It is to be noted that it is not necessary for the number of acoustic depressions to equal the number of peaks in the intensity distribution. Indeed, it may be sufficient to have only a single, central depression in the acoustic index, or only one or more rings having an acoustic depression. The table of FIG. 9(c) lists the effects of selected dopants upon both the optical and acoustic indices (relative to silica), where the particular dopants included in this table are considered to be exemplary only, and certainly not an exhaustive listing of the various dopant species (or combinations thereof) that may be utilized in the practice of the present invention.

Experimental Results

Figure 10:
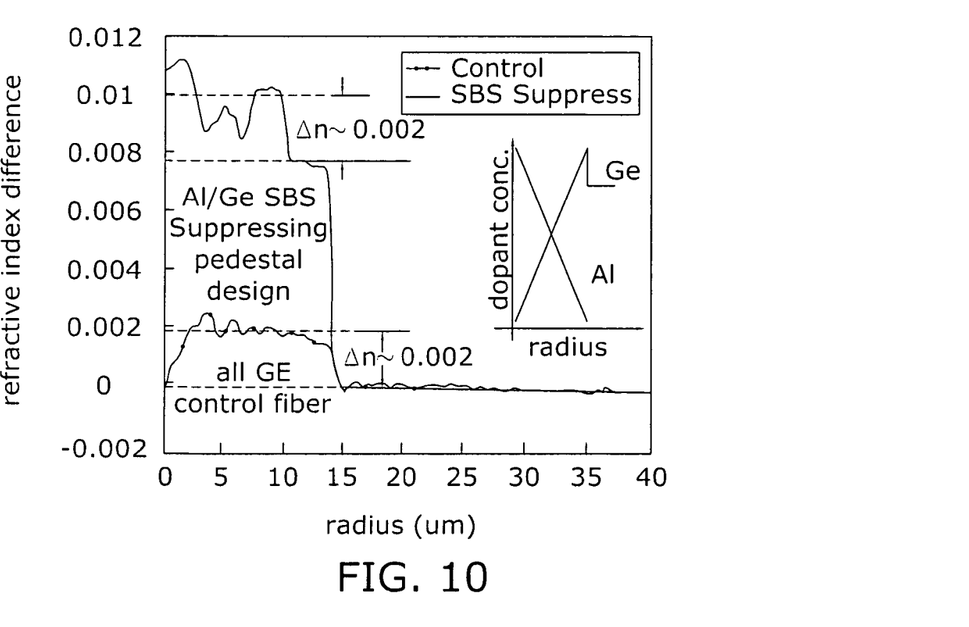
FIGS. 10-13 contain various graphs containing experimental results associated with one embodiment of the present invention.
Figure 11:
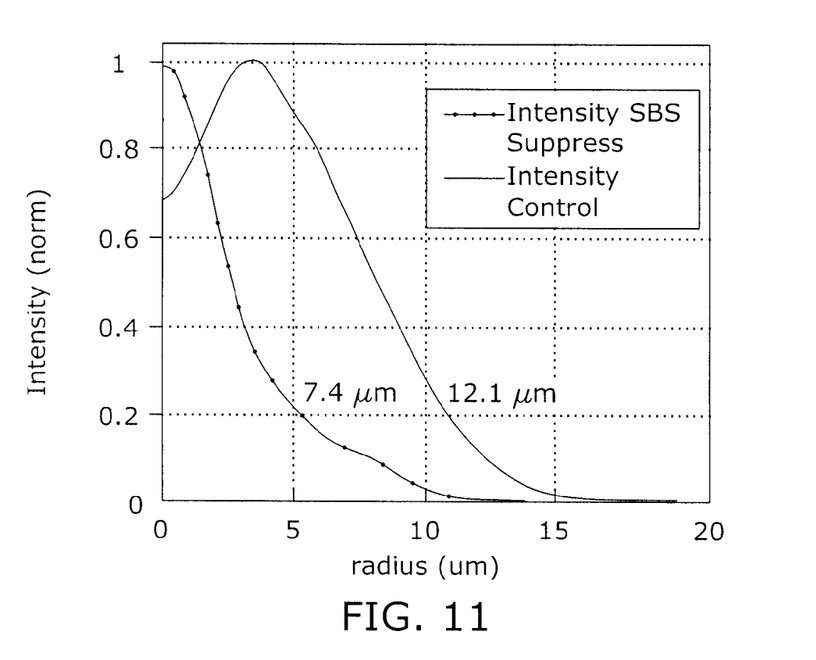

A prototype SBS suppressing fiber was designed according to the disclosed principles of the present invention. A Yb-doped double clad fiber was made with a core diameter of 22 um, a pedestal diameter of 28 um, an inner core Δn of ~0.002 and a pedestal Δn of 0.008. The index profile is shown in FIG. 10, along with the index profile of a non-SBS suppressing conventional prior art fiber (used as a control fiber). The solid line indicates the equivalent optical index for the Al/Ge fiber with the pedestal index profile. A schematic of the Al and Ge dopant profiles is included in the inset of FIG. 10. The normalized intensity profiles are shown in FIG. 11. Note that the control fiber has a central dip due to burn-off of the Ge at the central fiber region. The SBS-suppressing fiber of the present invention has an optical effective area of 177 μm² and the control fiber has an optical effective area of 314 μm².

Figure 12:
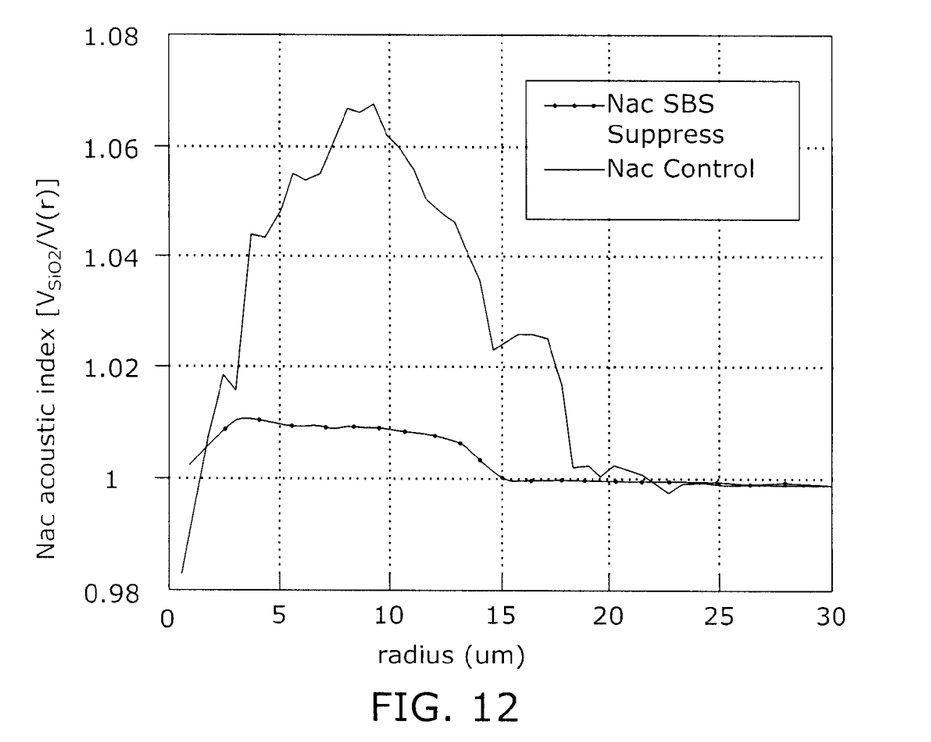
Figure 13:
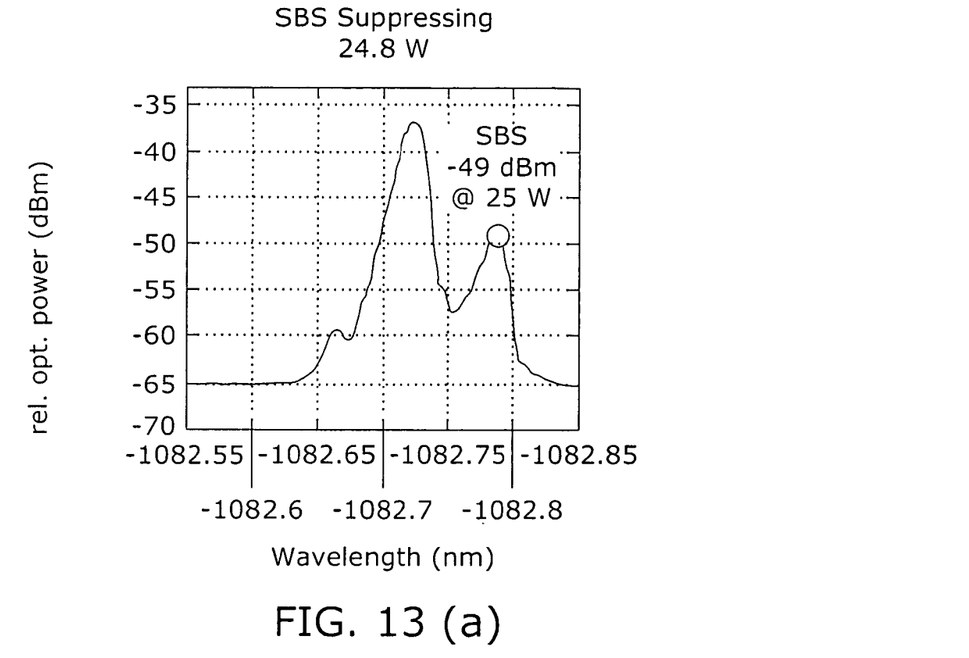

FIG. 12 is a plot of the acoustic index profile N(r) as a function of radius for the two fibers. The acoustic index for the SBS suppressing fiber was determined by an ultrasonic measurement and that for the control fiber by the constitutive relations between the sound speed and Ge dopant concentration. It is seen that the inventive SBS suppressing fiber exhibits a very large acoustic index contrast of ~0.09 and a large index slope of ~0.011/μm. On the other hand, the control fiber has a small acoustic index contrast of 0.01 and a small slope ~0.003/μm. FIG. 13(a) shows the SBS spectra of the SBS-suppressing fiber with the SBS peak approximately equal to −48 dBm at a fiber power of 24.8 W, and FIG. 13(b) shows a similar spectra of the control fiber exhibiting an SBS power of −48 dBm at a fiber power of 6.9 W. Therefore, the SBS suppressing fiber of the present invention demonstrates ~5.6 dB suppression relative to the control fiber. It can be assumed that if the two fiber modal effective areas were equal, that the SBS suppressing fiber would exhibit ~8.1 dB suppression relative to the control fiber. A more detailed analysis has further indicated that the relative SBS suppression may be as high as 11.2 dB.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principles and operation of the invention. It will become apparent to those skilled in the art that various modifications to the preferred embodiments of the invention as described herein can be made without departing from the spirit or scope of the invention as defined by the claims appended hereto.

What is claimed is:

1. An optical fiber comprising:
   a core area having a diameter of at least 10 μm;
   a cladding layer disposed to surround the core area, wherein the core area is doped in predetermined regions to create an acoustic refractive index profile that excludes thermal phonons from areas occupied by the optical mode and exhibits a slope of at least 0.005/μm to create a negative lens structure that refracts acoustic electrostrictively-generated waves away from the core area occupied by said optical mode and reduced phonon-photon interaction time and/or length.

2. The optical fiber as defined in claim 1 wherein the acoustic refractive index profile is a monotonic profile generated by decreasing dopant concentration toward the center of the core area.

3. The optical fiber as defined in claim 2, wherein the dopant concentration in the core area provides a difference (contrast) in acoustic index between the center of the core area and an outer periphery of the core area greater than 0.05.

4. The optical fiber as defined in claim 3 wherein the core area exhibits a pedestal optical index profile.

5. The optical fiber as defined in claim 1 wherein the core area exhibits a diameter greater than approximately 20 μm.

6. The optical fiber as defined in claim 1 wherein the doping profile of the optical and acoustic refractive indices are configured to reduce an overlap integral between a forward-directed optical field (photon) and retreating acoustic field (phonon), defined as a photon-phonon overlap integral.

7. The optical fiber as defined in claim 1 wherein the fiber comprises a large mode area (LMA) fiber.

8. The optical fiber as defined in claim 1 wherein the fiber comprises a higher-order-mode (HOM) fiber.

9. The optical fiber as defined in claim 8 wherein the core area is configured to exhibit a profile comprising a central area doped with a first combination of dopant species and at least one ring area doped with a second combination of dopant species, the spacing of the at least one ring controlled to refract the acoustic energy away from the optical mode field.

10. The optical fiber as defined in claim 9 wherein the core area is configured to have a central area doped with the first combination of dopant species and a plurality of ring areas doped with the second combination of dopant species.

11. The optical fiber as defined in claim 1 wherein the core area comprises
   a central core portion; and
   a ring core portion surrounding the central core portion and including a dopant species able to simultaneously increase the optical refractive index and decrease the acoustic refractive index.

12. The optical fiber as defined in claim 11 wherein the ring core portion is doped with aluminum.

13. The optical fiber as defined in claim 11 where the width of the ring core portion is selected to remain less than the lifetime of the phonons to refract the acoustic energy out of the optical field.

14. The optical fiber as defined in claim 1 wherein the core area is doped to exhibit a pedestal refractive index profile.

* * * * *